United States Patent [19]

Meissner

[11] 4,204,033

[45] May 20, 1980

[54] ELECTRICAL CELL CONSTRUCTION

[75] Inventor: Herman P. Meissner, Winchester, Mass.

[73] Assignee: Massachusetts Institute of Technology, Cambridge, Mass.

[21] Appl. No.: 330

[22] Filed: Jan. 2, 1979

[51] Int. Cl.$^2$ .............................................. H01M 8/12
[52] U.S. Cl. ...................................... 429/33; 429/107
[58] Field of Search .................. 429/17, 30, 31, 21, 429/19, 107, 101, 32, 33

[56] References Cited

U.S. PATENT DOCUMENTS

| 3,429,749 | 2/1969 | Baukal ...................................... 429/31 |
| 3,525,646 | 8/1970 | Tannenberger et al. ............... 429/31 |

FOREIGN PATENT DOCUMENTS 1481915  4/1967  France ......................................... 429/31

Primary Examiner—Donald L. Walton
Attorney, Agent, or Firm—Arthur A. Smith, Jr.; Paul J. Cook

[57] ABSTRACT

Electrical cells are provided including a plurality of hydrogen-oxygen fuel cells imbedded in a porous mass of iron-ferrous oxide, which can be present as porous particles. The fuel cells are formed of tubes including an inner anode wall, an outer cathode wall adjacent the particles and a solid electrolyte that permits oxygen ion transfer positioned between the cathode and anode. During cell charging, the particles are reduced and during cell discharging, the particles are oxidized.

7 Claims, 3 Drawing Figures

ELECTRICAL CELL CONSTRUCTION

BACKGROUND OF THE INVENTION

This invention relates to a method and apparatus for producing and storing electrical energy at elevated temperatures by utilizing a porous bed of iron-iron oxide, which can be alternately oxidized and reduced, as the storage reservoir.

It has been proposed to utilize storage batteries to level the load on power plants over a given time period. Substantial economies are possible over power plants having no auxiliary load leveling means, since power plants normally experience about a 40% load variance over a typical 24 hour period. A large number of different battery systems have been proposed for this purpose, including lead-acid cells, nickel-iron cells, nickel-zinc cells, lithium-sulfur cells and zinc-chlorine systems. The lithium-sulfur and sodium-sulfur cells suffer from the disadvantages that the materials utilized are expensive and are highly corrosive. The other cells are disadvantageous because of their high cost.

The proposed system, by operating at elevated temperatures, can be more efficiently integrated into a power plant system than alternative storage batteries.

SUMMARY OF THE INVENTION

This invention provides a means for storing electrical energy, including a plurality of electrolytic cells immersed in a bed of a mixture of iron-iron oxide. Each cell comprises an oxygen electrode, a hydrogen electrode with its associated iron oxide bed and a solid electrolyte separating these electrodes. The cell system is maintained at a different temperature to permit current flow through the electrolyte, both during charge and discharge. A mixture of hydrogen and water vapor fills the voids in the iron-iron oxide and the hydrogen electrode with which the bed makes contact. During charging, hydrogen produced at this electrode by reduction of water vapor finds its way to the iron oxide in the bed, converting this to metallic iron and water vapor. This water vapor returns to the hydrogen electrode for reduction to hydrogen gas and oxygen ions. The oxygen ions, of course, pass through the electrolyte to the oxygen electrode.

In discharging, the process of charging described above at the hydrogen electrode is reversed.

This invention provides substantial operating advantages including the fact that the composition of the bed, the electrolyte and the oxygen source are inexpensive and non-toxic. In addition, this apparatus is compact since the electrochemical energy is stored in a solid phase. Furthermore, the high temperature heat liberated during cell discharge can be used to advantage in commercial heating units in contrast to available low temperature batteries.

DETAILED DESCRIPTION OF SPECIFIC EMBODIMENTS

Figure 1:
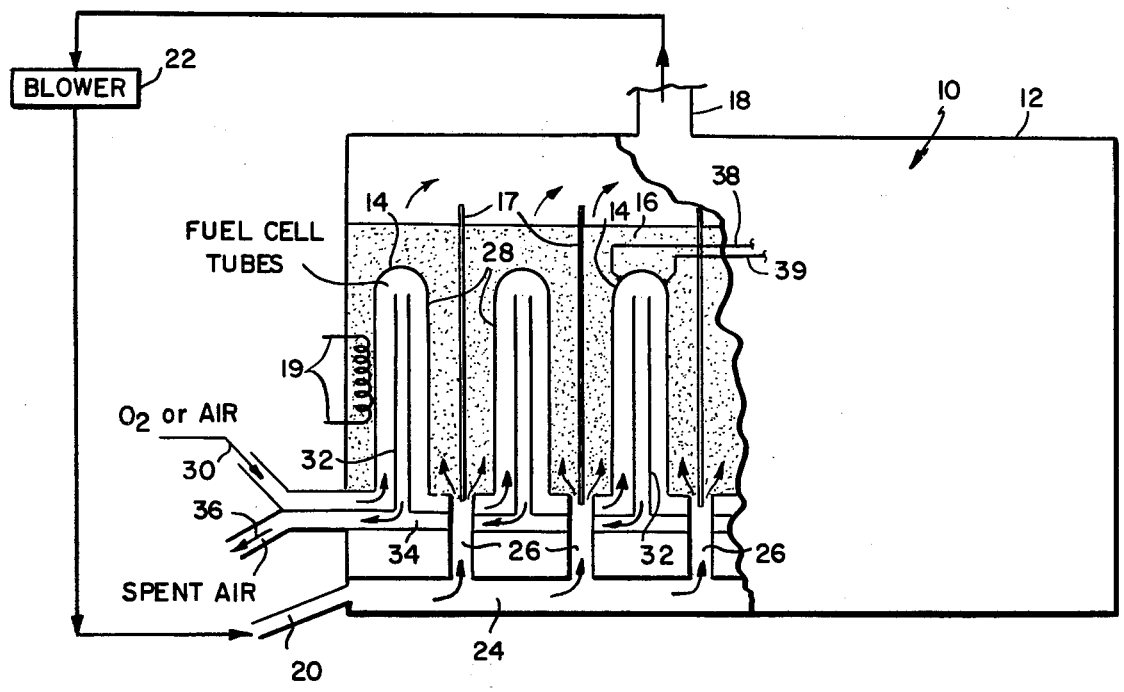
FIG. 1 is a partial interior view of a plurality of cells.

This invention provides a cell structure including a plurality of electrical cells comprising sheets of solid electrolytes coated on one side with a suitable material to serve as a hydrogen electrode, on the other as an oxygen electrode. Conveniently, these cells can be arranged as long cylinders with the hydrogen electrode on the outside, the oxygen on the inside. The hydrogen electrodes are in direct contact with a bed of iron and ferrous oxide particles, or a bed of ferrous oxide and ferric oxide particles. In either case, the iron in the particles changes from a lower to a higher state of oxidation and back again, depending on the ratio of water vapor to hydrogen in the surrounding gas, in turn controlled by the cell voltage.

In one embodiment of this invention, the electrolytic cells are in the form of ceramic tubes, coated on the inside and outside with suitable electrode materials. Oxygen is withdrawn or supplied to the inside of the tubes, where the so-called oxygen electrodes are located. The hydrogen electrodes are on the outside of the cell tubes. These cells are immersed in a porous mass of iron-iron oxide, which can be a stationary bed or a fluidized bed, depending on the velocity of the gas flowing. This gas, which is totally recycled to the bed, is a mixture of hydrogen and water vapor. It will become clear that the hydrogen in this gas, present as such and in combination with oxygen as water, is constant in amount in this electrode system. This hydrogen serves as an oxygen carrier, transporting the oxygen between the electrode and the iron oxide bed.

For protection against erosion by the iron oxide particles, especially when these are fluidized, the hydrogen electrodes are covered by a porous ceramic coating.

As further discussed below, this system acts as a large storage battery, storing electrical energy when the voltage rises and delivering electrical energy when voltages fall. Operation at all times is at essentially constant temperature and any convenient pressure such as atmospheric. To keep the system isothermal, some heat must be removed during discharge and added during charge. No significant amounts of externally generated reagent such as hydrogen are required. A little steam may be needed from time, plus some iron ore, to make up for losses.

Charging is effected when a voltage greater than water's decomposition voltage, e.g., 0.92 at 900° C., is imposed across the electrodes of these submerged tubular cells, with the oxygen electrode as anode, a current flows. Water vapor is decomposed at the hydrogen electrode to hydrogen gas and oxygen ions, and these ions pass through the ceramic electrolyte and are discharged as oxygen gas at the anode. The hydrogen gas formed immediately mixes into the gas within the bed and reacts with the iron oxide, forming water vapor and metallic iron. As current continues to flow, more water vapor is cathodically decomposed to hydrogen, and this hydrogen converts more iron oxide to metallic iron, forming additional water vapor. The net result of thus charging the system is that the iron oxide bed is more or less extensively converted to metallic iron, while the oxygen lost from the iron oxide travels as water vapor to the cathode, and then travels through the electrolyte as oxygen ions to the anode for conversion to oxygen gas.

The reactions occurring during charging may be represented as follows:

1. At the oxygen electrode

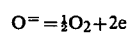

2. At the hydrogen electrode $$H_2O + 2e = H_2 + O^=$$

3. In the bed $$FeO + H_2 = Fe + H_2O$$

The hydrogen generated in reaction 2 is immediately consumed in reaction 3 to form more metallic iron and water vapor. The total quantity of gas moles of hydrogen plus water vapor in this hydrogen gas system obviously remains constant while reactions proceed. It follows that recycle of this hydrogen-containing gas is a closed loop, requiring no purging or make-up. In the limit, no recycle is needed, the hydrogen and water vapor travelling between the hydrogen electrode and iron oxide bed by molecular diffusion alone.

Consideration of the foregoing three reactions shows that their sum during charging is:

4. $FeO = Fe + \frac{1}{2}O_2$

In other words, the net reaction occurring is the decomposition of ferrous oxide (Wustite) to the elements, with oxygen being ejected to the surroundings.

The charging period described above is terminated when the voltage across the electrodes is reduced to below water's decomposition voltage. Current flow reverses, and the tubular cells now become producers of electrical energy, rather than consumers. All of the above reactions reverse. Oxygen becomes oxygen ions at the oxygen electrodes of the cell, pass through the solid electrolyte, and react with hydrogen to form water vapor at the hydrogen electrodes. This water vapor reacts with the iron particles to form iron oxide and more hydrogen, which reacts, in turn, with more oxygen ions at the electrodes to form more water vapor. The net reaction during discharging is therefore the reverse of reaction (4), namely, 5. $Fe + \frac{1}{2}O_2 = FeO$ During charging, to keep the system isothermal, there is an overall requirement of heat. Such heat is easily supplied in several ways, as by burning some methane (or other fuel) within the cell tubes. Relatively little heat is required here, so that the oxygen required for both combustion and battery operation is easily supplied through these tubes. Alternatively, solids could be withdrawn, heated externally and recycled to the battery system. Alternatively again, separate heating tubes could be installed.

When left in contact with iron-ferrous oxide particles, with the electrodes not connected electrically, then the ratio of hydrogen to water vapor in the gas in the bed of iron-iron oxide particles will be found to be about 1.6 at 900° C. This ratio, of course, reflects the equilibrium conditions for the foregoing reaction (3). When charging the battery, then the operating voltage (depending on the current densities used) will be 1 volt or more, and the gas will have a ratio of hydrogen to water vapor of perhaps 1.7 to 1.8. On the other hand, when discharging the battery, then the operating voltage will fall to about 0.85 volts or less again depending on current densities. The gas in the bed will now show a ratio of hydrogen to oxygen of 1.5 or less.

During discharge, heat is generated, and the system must be cooled to keep it isothermal. This heat could be removed in various ways, such as by a withdrawal of hot solids for external cooling prior to returns to the system, by having separate cooling (boiler) tubes in the bed, heat exchange means to cool the recycled gas, etc.

Representative suitable solid electrolytes include calcium zirconate or the like which permit oxygen ion transfer of at least about 900° C., preferably at least about 1000° C. Platinum would be suitable cathode material, while platinum or silver would be suitable for the oxygen electrode.

As stated above, the hydrogen cathode can be protected from erosion with a porous coating such as of porous alumina or the like. The porosity of the iron-iron oxide bed is determined by the diffusion and heat transfer characteristics desired. This battery system has been described with reference to a bed made up of iron-iron oxide particles in which case the particles can be anywhere from 0.1 microns to ¼ inch, depending on the case. It is to be understood that the analogous oxidation-reduction reactions for the ferrous oxide-ferric oxide are equally applicable in the present invention; the major difference being that iron is in a different oxidation state when oxidized or reduced, resulting in a less favorable cell voltage.

Referring to FIG. 1, the electrical cell 10 includes a housing 12, a plurality of fuel cells 14 and a bed of particles 16 comprising a mixture predominantly of iron particles and ferrous oxide particles. For a particle bed which happens to be electrically conducting, so that short circuiting between cells can occur, then insulating partitions 17 or spaces are provided in the bed between cells. The bed of particles 16 is maintained either as a fluidized bed or as a fixed bed by recycling gas from the bed 16, through outlet 18 and back into the gas inlet 20 by means of blower 22. The composition of the recycled gas depends upon whether the cell is being charged or discharged as described above. In any event, the gas is directed into plenum chamber 24, then through tube 26 and into the bed 16. When fluidizing, the recycled gas serves to maintain the bed 16 in its desired dilute phase and to provide or remove heat to the bed 16 as described. During charging of the cell 10, oxygen is removed from the gas 30 in the tube 14. During discharging of the cell 10, oxygen is added to the gas 30 in the tube 14. The gas in tube 14 is removed through conduits 32, into the plenum chamber 34 and outlet 36. Typical operating temperatures are about 900° C. to 1100° C. with cooling in this case accomplished by passing a suitable cooling fluid through the cooling tube 19 and heating accomplished when needed by adding some methane to the oxygen or air at 30. Electrical energy is supplied or removed from the cells by means of electrical leads 38 and 39 connected respectively to the cathode and anode of each cell tube 14.

Figure 2:
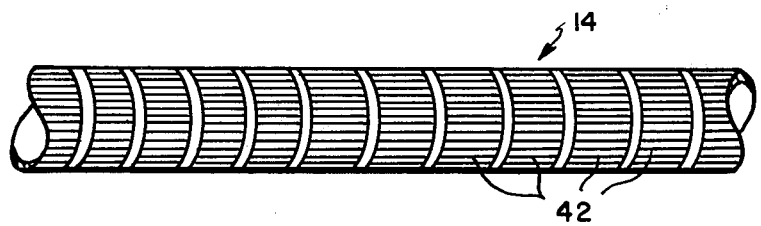
FIG. 2 is a side view of the exterior of a cell.
Figure 3:
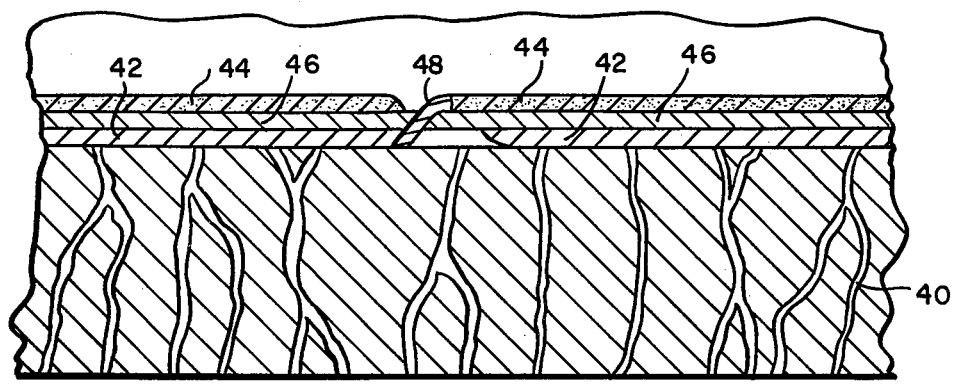
FIG. 3 is a cross-sectional view of a cell wall.

A typical cell tube construction involving a number of cells connected in series is shown in FIGS. 2 and 3. The tube 14 comprises an outer, porous, protecting coating 40, a cathode 42 such as of platinum which is segmented along the length of the tube 14 as shown in FIG. 2 (without the protecting coating) on the inner anode 44 such as platinum and a solid electrolyte 46 such as calcium zirconate. In such constructions, the iron oxide bed surrounding each cell is separated from the neighboring cells by a space or insulating wall to avoid short circuiting. The anode 44 and the cathode 42 are connected by means of an interconnecting strip 48.

I claim:

1. An electrical cell which comprises (a.) at least one bed of iron particles including particles at different oxidation states,
(b.) at least one fuel cell comprising a cathode adjacent one of said beds, an anode which does not contact said bed and a solid electrolyte positioned between said anode and said cathode,
(c.) said electrolyte being capable of transporting oxygen ion,
(d.) means for cycling a gas through said bed to control the temperature of said bed, and
(e.) means for passing a gas in contact with said anode to promote oxygen ion transfer through said electrolyte.

2. The electrical cell of claim 1 wherein said particles comprise predominantly a porous mass of ferrous oxide particles and ferric oxide.
3. The electrical cell of claim 1 wherein said particles comprise predominantly a porous mass of iron particles and ferrous oxide.
4. The electrical cell of claim 1 comprising a plurality of said fuel cells.
5. The electrical cell of claim 2 comprising a plurality of said fuel cells.
6. The electrical cell of claim 3 comprising a plurality of said fuel cells.
7. The electrical cell of claim 1 wherein said solid electrolyte comprises calcium zirconate.

* * * * *